Jan. 5, 1932.  C. J. LORGION  1,839,487
VEHICLE BRAKE
Filed July 18, 1929   2 Sheets-Sheet 1
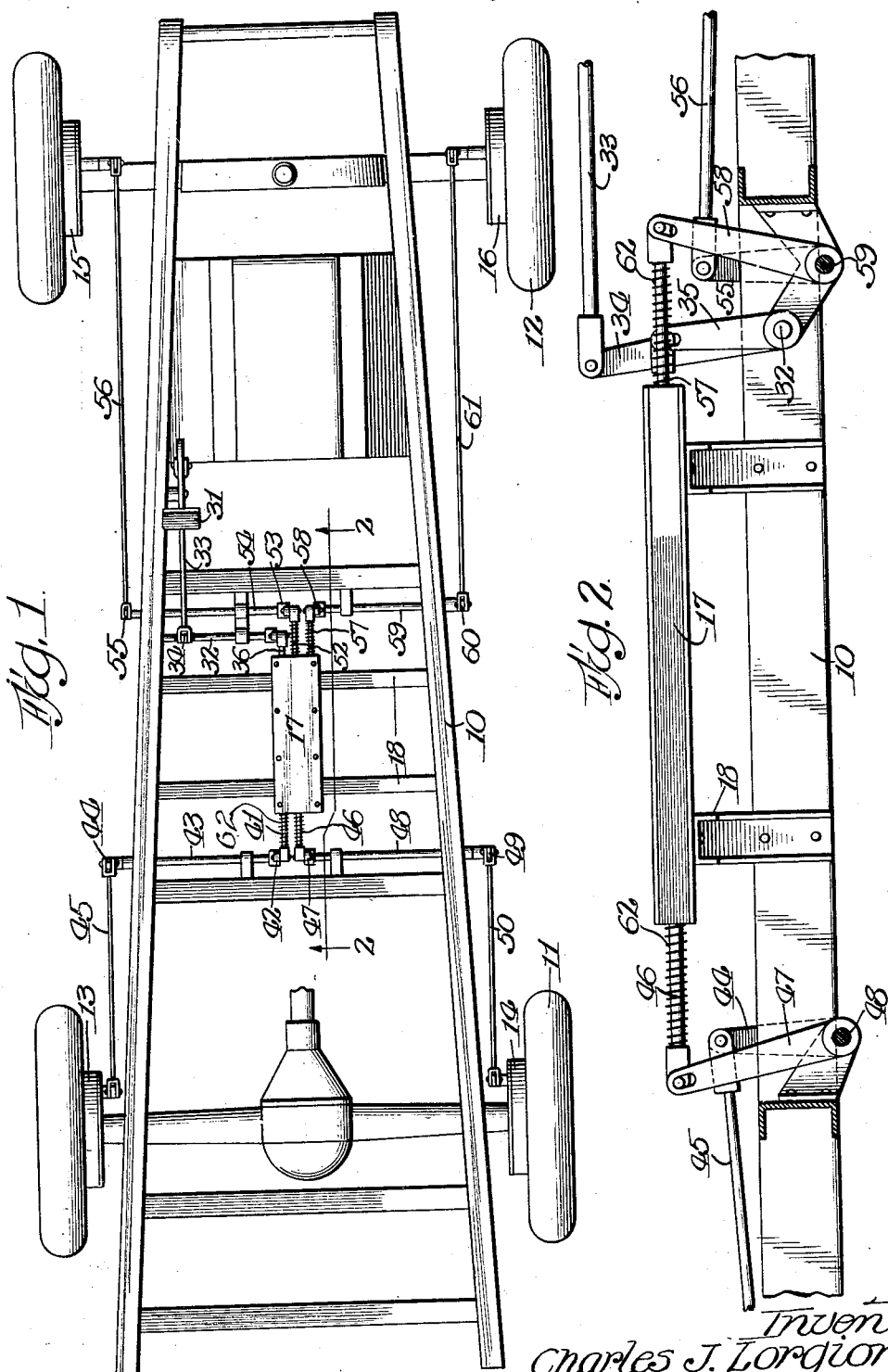
Inventor;
Charles J. Lorgion
By: Glenn S. Noble, Atty.

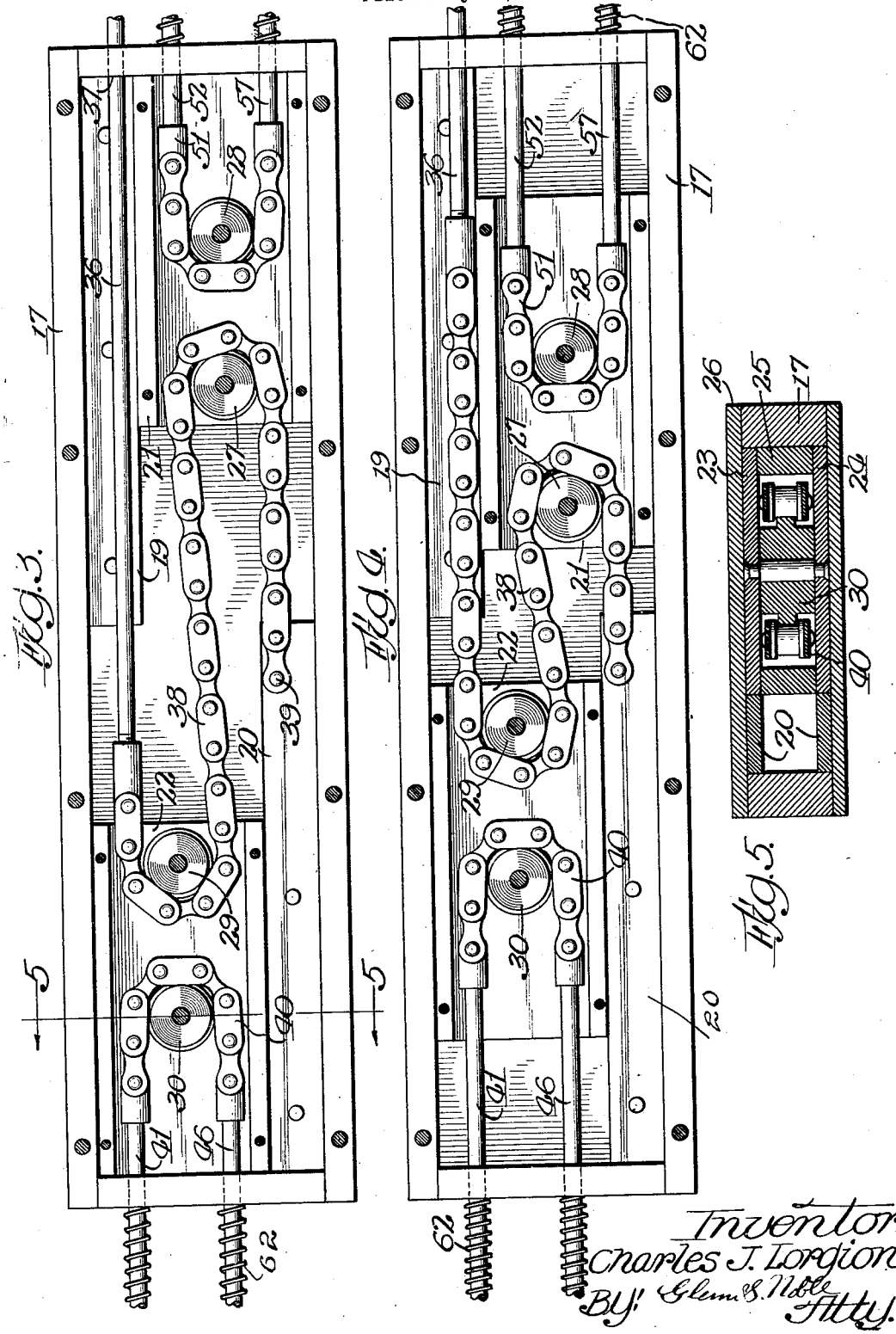

Patented Jan. 5, 1932

1,839,487

UNITED STATES PATENT OFFICE

CHARLES J. LORGION, OF OAK PARK, ILLINOIS

VEHICLE BRAKE

Application filed July 18, 1929. Serial No. 379,256.

It has heretofore been found difficult to provide means, particularly in connection with mechanically operated brakes, whereby equal force will be applied to each of the brakes of a pair of wheels, or to properly distribute the braking effort between the various wheels when four-wheel brakes are used. In accordance with the present invention I provide a novel equalizing arrangement whereby the same force may be applied to the brakes of all of the wheels when more than one pair of wheels is provided with brakes, or power may be equally distributed between the brakes of the respective pairs of wheels as desired.

The objects of this invention are to provide a new and improved equalizing mechanism for vehicle brakes; to provide brake operating mechanism whereby the force will be applied equally to each of the brakes of a pair of wheels or to all of the wheels of a vehicle; to provide a simple and efficient brake operating mechanism for automobiles; and to provide such further advantages and improvements as will be described more fully in the following description.

In the accompanying drawings illustrating one form of this invention

Figure 1 is a plan view of an automobile chassis provided with my braking mechanism, parts being shown diagrammatically for convenience in illustration;

Figure 2 is an enlarged sectional view taken on the line 2—2 of Figure 1;

Figure 3 is a detail plan view of the principal parts of the equalizing mechanism shown in normal position;

Figure 4 is a view similar to Figure 3 with the parts shown in braking position; and Figure 5 is an enlarged cross section taken on the line 5—5 of Figure 3.

As shown in these drawings the vehicle or automobile is provided with the usual frame 10, rear wheels 11 and front wheels 12. The rear wheels are provided respectively with brakes 13 and 14, and the front wheels with brakes 15 and 16, all of which may be of any desired type of construction.

My equalizing mechanism is preferably mounted in a box or casing 17 which is rigidly secured to the frame as by being riveted to the cross pieces 18, as shown in Figures 1 and 2. The casing 17 is provided with guides 19 and 20 to provide guideways for slidable blocks or carriages 21 and 22. These carriages preferably comprise top and bottom plates 23 and 24 and sides 25, thereby making open-ended boxes which are held in position by the cover 26 of the casing 17. The carriage 21 has two sprocket or guide wheels 27 and 28, and the carriage 22 has two similar wheels 29 and 30.

In the arrangement shown the brake pedal 31 is operatively connected with a rock shaft 32 in the usual manner, as by means of a rod 33 and arm 34. The shaft 32 is provided with another arm 35 which is pivotally connected with a brake rod 36 which projects into the casing 17 through a hole or bearing 37. The inner end of the rod 36 is connected with a flexible member which is shown as a chain 38. This chain passes over the wheel 29, then around the wheel 27 and has its opposite end secured to the casing 17 as by means of a pin or bolt 39. A flexible member such as a chain 40 passes around the wheel 30 and the ends thereof are operatively connected with the respective brakes 13 and 14 of the rear wheels. One end of the chain 40 is connected with a rod 41 which passes out through a hole in the end of the casing 17 and is pivoted to an arm 42 on a rock shaft 43. This shaft has a second arm 44 which is connected by means of a rod 45 with the brake 13. The opposite end of the chain 40 is secured to a rod 46 which passes out through a hole in the casing and is connected with an arm 47 on a rock shaft 48 which is provided with a second arm 49 connected with the brake 14 by means of a rod 50.

Another chain or flexible member 51 passes around the wheel 28 and has one end connected to a rod 52 which passes out through a hole in the casing. The opposite end of this rod is pivoted to an arm 53 on a rock shaft 54 having an arm 55 connected with the brake 15 by a rod 56.

The opposite end of the chain 51 is secured to a rod 57 which passes out through a hole in the casing 17 and is connected to an arm 58 on the rock shaft 59. This shaft has an arm 60 connected with a brake 16 by a rod 61.

In the operation of this device the driver presses on the brake pedal which causes the rod 36 to be drawn forwardly from the position shown in Figure 3. This pulls on the chain or flexible member 38 and, as the end thereof is fixed, the pressure on the wheels 27 and 29 will cause the slides or carriages 21 and 22 to be drawn inwardly or toward each other, as indicated in Figure 4. On account of this arrangement the force exerted will be divided equally between the two carriages. As the carriage 22 is moved in this direction, it pulls on the chain 40 and as this chain is free to run over the wheel 30, the force applied thereto will be equally divided between the rods 41 and 46 and consequently between the brakes 13 and 14.

As the carriage or slide 21 is drawn inwardly, the pull or tension on the chain 51 will be equally divided between the rods 52 and 57 and consequently between the brakes 15 and 16. By means of this arrangement it will be seen that the force exerted by the driver through the brake pedal will be properly distributed so that each of the brakes of the respective pairs will be applied with the same force which will prevent any tendency of uneven braking or dragging of one brake or permitting the other to run free. Of course, if it is desired to apply less force to the front wheel brakes, this may be done by the proper proportioning of the levers or arms.

When the brake is released, the pedal and the other parts are returned to normal position in the usual manner by means of suitable springs, but if desired compression springs 62 may be interposed between the ends of the casing 17 and the arms on the various rock shafts which will serve to assist in restoring the parts to normal position.

The casing 17 may be filled with suitable lubricant so that the device will be practically noiseless in operation and it will also be noted that this tackle construction or arrangement may be utilized in other ways, as for instance for operating a single pair of brakes or in connection with other forms of braking apparatus. Therefore I do not wish to be limited to the particular construction or arrangement herein shown and described, except as pointed out in the following claims in which I claim:

1. In an apparatus of the character set forth, the combination with a member to which the braking power is applied, of a casing, a flexible member having one end secured to said member and the other end secured to the casing, a pair of carriages slidably mounted in the casing, wheels on said carriages engaging with the flexible member, a second wheel on each of said carriages, a flexible member passing around each of said last named wheels, and connections between the ends of the last named flexible members and the brakes of the respective wheels of the vehicle.

2. In a brake mechanism, the combination of a casing, a brake rod extending into the casing, a chain having one end secured to the brake rod, and the other end secured to the casing, a pair of carriages slidably mounted in the casing, wheels on the respective carriages engaging with said chain whereby the carriages will be drawn together when power is applied to the rod, a second wheel on one of said carriages, a chain around the second named wheel, brake rods connected with the ends of the chain, operative connections between the brake rods and the respective brakes of one pair of wheels of the vehicle, a wheel mounted on the other carriage, a chain passing around said wheel, brake rods connected with said chain, and operative connections between the brake rods and the respective brakes of another pair of wheels of the vehicle.

3. An equalizer for brakes comprising a casing, guideways in said casing, slides engaging with the guideways at either end of the casing, guide wheels mounted on the inner ends of said slides, a flexible member passing around said guide wheels and having one end secured to the casing, a brake rod secured to the opposite end of said flexible member and projecting out through the casing, a second guide wheel on each of said slides, a flexible member passing around each of said last named guide wheels and brake rods secured to the ends of said flexible members and extending through the casing.

CHARLES J. LORGION.